United States Patent
Wickham

(10) Patent No.: US 11,129,010 B2
(45) Date of Patent: Sep. 21, 2021

(54) EMERGENCY MANAGEMENT SYSTEM

(71) Applicant: Retrac, Inc., Cedar Rapids, IA (US)

(72) Inventor: Paula Wickham, Cedar Rapids, IA (US)

(73) Assignee: Retrac, Inc., Cedar Rapids, IA (US)

(*) Notice: Subject to any disclaimer, the term of this patent is extended or adjusted under 35 U.S.C. 154(b) by 0 days.

(21) Appl. No.: 16/418,283

(22) Filed: May 21, 2019

(65) Prior Publication Data

US 2019/0357031 A1 Nov. 21, 2019

Related U.S. Application Data

(60) Provisional application No. 62/674,263, filed on May 21, 2018.

(51) Int. Cl.
*H04M 11/04* (2006.01)
*H04W 4/90* (2018.01)
*H04W 4/029* (2018.01)

(52) U.S. Cl.
CPC ............ *H04W 4/90* (2018.02); *H04W 4/029* (2018.02)

(58) Field of Classification Search
CPC ......... H04W 4/02; H04W 4/22; H04W 48/04; H04W 64/00; H04W 76/007; H04M 11/04; H04M 11/045; H04M 2242/04
USPC ............ 455/404.1–404.2, 456.1–456.6, 457; 379/37–51
See application file for complete search history.

(56) References Cited

U.S. PATENT DOCUMENTS

| | | | |
|---|---|---|---|
| 2014/0365390 A1* | 12/2014 | Braun | G06Q 50/265 705/325 |
| 2015/0100348 A1* | 4/2015 | Connery | G16H 40/67 705/3 |
| 2015/0148988 A1* | 5/2015 | Fleck | G08B 25/016 701/2 |
| 2016/0179900 A1* | 6/2016 | Stefik | G06Q 10/0637 707/771 |
| 2017/0099579 A1* | 4/2017 | Ryan | H04W 4/029 |
| 2017/0294131 A1* | 10/2017 | Jedrzejewski | H04W 4/08 |
| 2018/0082573 A1* | 3/2018 | Zuckerman | A61B 5/747 |
| 2018/0247070 A1* | 8/2018 | Evans | G08B 13/19684 |
| 2019/0137996 A1* | 5/2019 | Zhang | G05D 1/0027 |
| 2019/0149959 A1* | 5/2019 | Kee | H04W 4/08 |
| 2019/0208392 A1* | 7/2019 | Merjanian | H04W 4/029 |
| 2020/0347674 A1* | 11/2020 | Haynes | G01L 1/22 |

* cited by examiner

*Primary Examiner* — Matthew W Genack
(74) *Attorney, Agent, or Firm* — Zarley Law Firm, P.L.C.

(57) ABSTRACT

An emergency management system having a downloadable cloud base website that assists in the management of an emergency event. Based upon an emergency notification from a first responder, the website sends an initial emergency notification to primary parties. Based upon the type of emergency, a second emergency notification is sent to secondary parties. A two-way communication system is activated between the secondary parties and at least one of the primary parties known as an administrator.

19 Claims, 3 Drawing Sheets

EMERGENCY MANAGEMENT SYSTEM

CROSS REFERENCE TO RELATED APPLICATIONS

This application claims the benefit of the priority of U.S. Provisional Application No. 62/674,263 filed May 21, 2018, the contents of these applications are hereby incorporated by reference in their entirety.

BACKGROUND OF THE INVENTION

The present invention is directed to an emergency management system, and more particularly, an emergency management system that provides faster and improved communication in order to provide basic emergency information and assistance in emergency situations prior to the arrival of trained public safety 911 volunteer or professional emergency personnel/first responders.

Emergency management systems, including emergency management mobile applications are known in the art. Studies conducted by the American Heart Association (AHA) have confirmed that the use of emergency management systems and the use of mobile technology and social media improves outcomes for survival during cardiac events. Bystander CPR performance rates improved as did to the time until AED use by responders. Improvements in CPR and AED use directly impact survival rates of persons suffering out of hospital cardiac arrest (OHCA). OHCA is a leading cause of death in the United States. EMERGENCY MANAGEMENT MOBILE APPLICATION SOFTWARE is an easy way for dispatch 911 centers to have Computer Aided Dispatch (CAD) systems program an outbound message on certain dispatch screens for an automated outbound email to an EMERGENCY MANAGEMENT MOBILE APPLICATION SOFTWARE application program interface (API) so that any nearby mobile application users can receive notifications and respond more quickly than 911 volunteer or professional EMS. A problem in emergency management is that response times will likely be more an average 8 to 10 minutes in metro or urban areas of the U.S. and in rural areas, average response times are often much longer and vary due to the remote situations where response times by 911 dispatched individuals or teams may take up to 30 minutes or longer, depending on the emergency.

While useful, the overall problem in pre-EMS arrival emergency management (or any emergency management situation where 911 is called) that has existed historically is that there is a lack of proper continual real-time 2 way communication and documentation and access to information by all parties or groups that are part of an emergency event. This would include victims, others on scene, others who are nearby (trained and untrained persons in public safety, law enforcement, healthcare, etc.). Accordingly, a need exists for an EMERGENCY MANAGEMENT MOBILE APPLICATION SOFTWARE system for solving the problem with fragmentation in emergency response and communication before EMS/911 dispatched responder arrival. This is done by providing a family of products and services which are designed to help in pre-EMS, Fire, or 911 law enforcement situations, that allow for a more effective 2-way communication system by those at the scene or those nearby who can help with the Emergency Management and take direction from 911 public safety answering point (PSAP)/dispatch personnel or any provided instructions by the PSAP systems or other dispatch or notification systems (such as an Amber Alert). It should be noted that it is not just about taking instructions or doing tasks, but also enabling those at the scene or helping or affected to provide detailed information through a common platform for those who 911 dispatch is sending to the emergency event. Any engagement and facilitation of communication of who is hurt, who needs help, who can help, who has assets, where the assets are, and what to do is going to decrease initial treatment response times and improve outcomes and survival rates of those impacted during the emergencies. Many times modern Emergency Management systems will allow for mass notification via text or voicemail or other communication but they lack the ability for users receiving the notifications to respond back and provide user status and messages real-time and continually. In addition, they lack information on where any mapped assets are that can assist those initial bystanders and users during the emergency.

An objective of the present invention is to provide an emergency management system that provides an emergency notification that is a two-way communication between at least one administrator and a plurality of secondary parties. The system can also be used as a 'see something-say something' application or website for any connected devices and users, helping to thwart suspicious activity and be useful as an anti-bullying reporting tool for student populations that are heavy users of mobile applications and mobile devices.

Another objective of the present invention is to provide an emergency management system that reduces response time for any connected user or guest and improve location accuracy of those impacted or responding to the event.

These and other objectives will be apparent to those having ordinary skill in the art based upon the following written description, drawings, and claims.

SUMMARY OF THE INVENTION

An emergency management system includes a downloadable cloud-based website or mobile device application that is accessible by primary parties and secondary parties. The cloud-based website or mobile application has information stored that is related to a plurality of locations.

The system is activated by any user who accesses the website or mobile application and submits an emergency notification. Preferably, the emergency notification includes the type of emergency and location of the emergency as well as the reporting person's location and details for any necessary filtering and event verification. The notification can be an alert that is a request for immediate help or assistance through an SOS feature/icon or a notification that can be sent through a customized (special designed logo such as school or company logo) icon that addresses a custom picklist of events or emergencies or an all-inclusive (all groups and parties) mass messaging/notification alert.

Based upon the type of emergency and location, the website sends out an initial notification to pre-selected primary parties that include an administrator who is pre-selected to manage the flow of information for the event, the people (users) affected and their location information using current GPS mapping technology, and the assets nearby to more quickly help users respond and help treat others needing help. For some emergency types the initial notification is sent to secondary parties as well.

If not already sent to all users affected, the administrator, using an interactive dashboard, selects the secondary parties or groups to be contacted and the desired communication notification. The communication notification provides critical lifesaving or important information and also prompts the secondary parties to provide a response on their status.

Notifications can be programmed to have custom audible sounds or alarms/alerts and even be programmed to be silent and not sound an audible alarm (for events where someone is hiding out to prevent harm being done to them).

The administrator, using the dashboard is able to track the status and communication of all primary and secondary parties and send subsequent communications that may include questions, identified problems, critical information and/or further instructions that are needed to manage the emergency effectively. The dashboard permits the administrator to quickly and efficiently identify problems and direct parties toward and away from the problem and available assets. The dashboard allows for sending notifications including but not limited to email, text/SMS, app push notifications, URL/PC notifications, and/or phone/voicemail messages.

911 dispatched responders that are arriving on scene and dispatch center professionals can access the cloud-based website and view critical resources for the event location such as floor plans, blue prints, and other archived critical information to help manage the emergency event and get users quicker help to "hot spots" or areas of concern that are identified through the emergency management system's map and conversation flowcharts.

DETAILED DESCRIPTION

Figure 1:
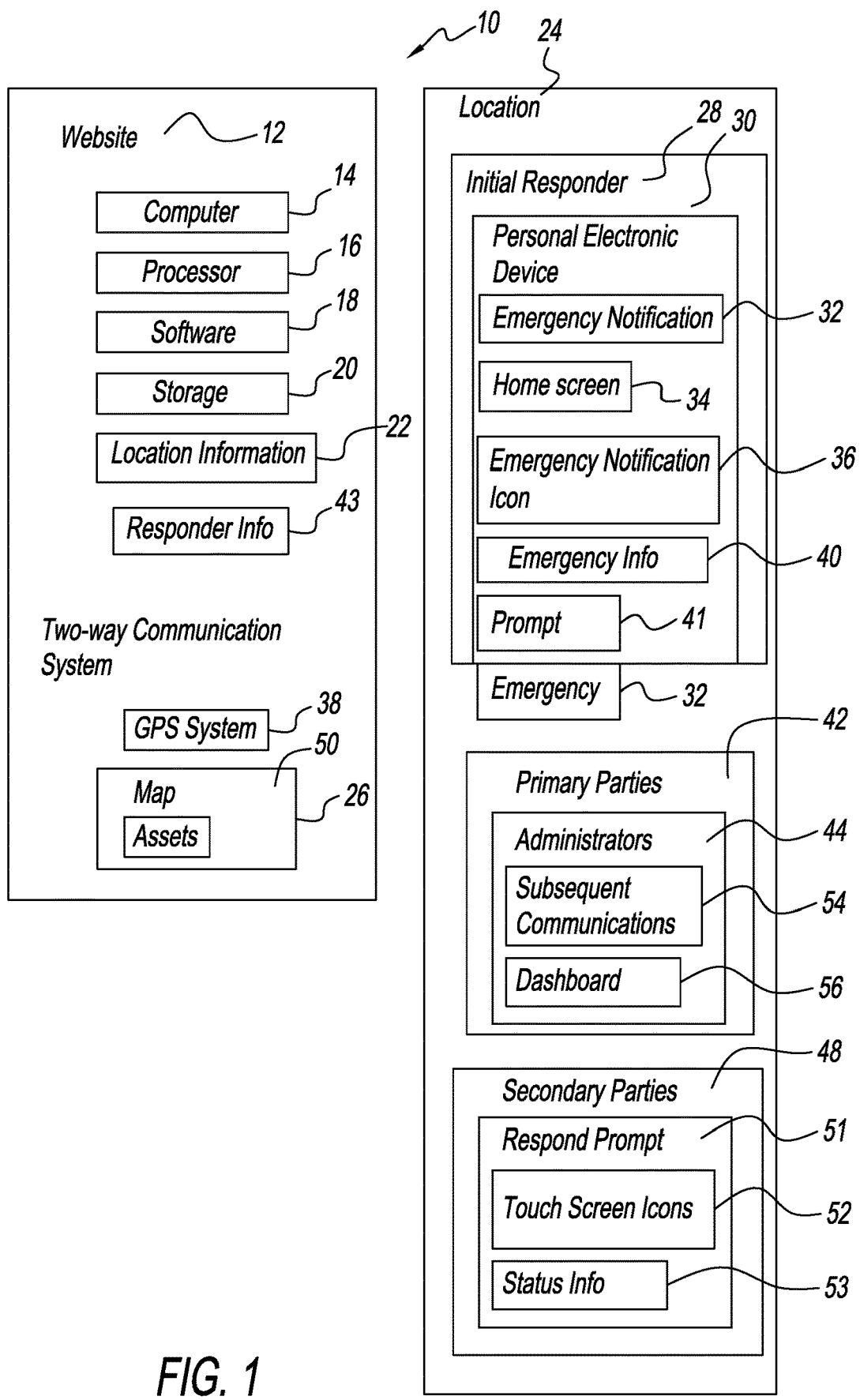
FIG. 1 is a schematic view of the environment for an emergency management system.
Figure 2:
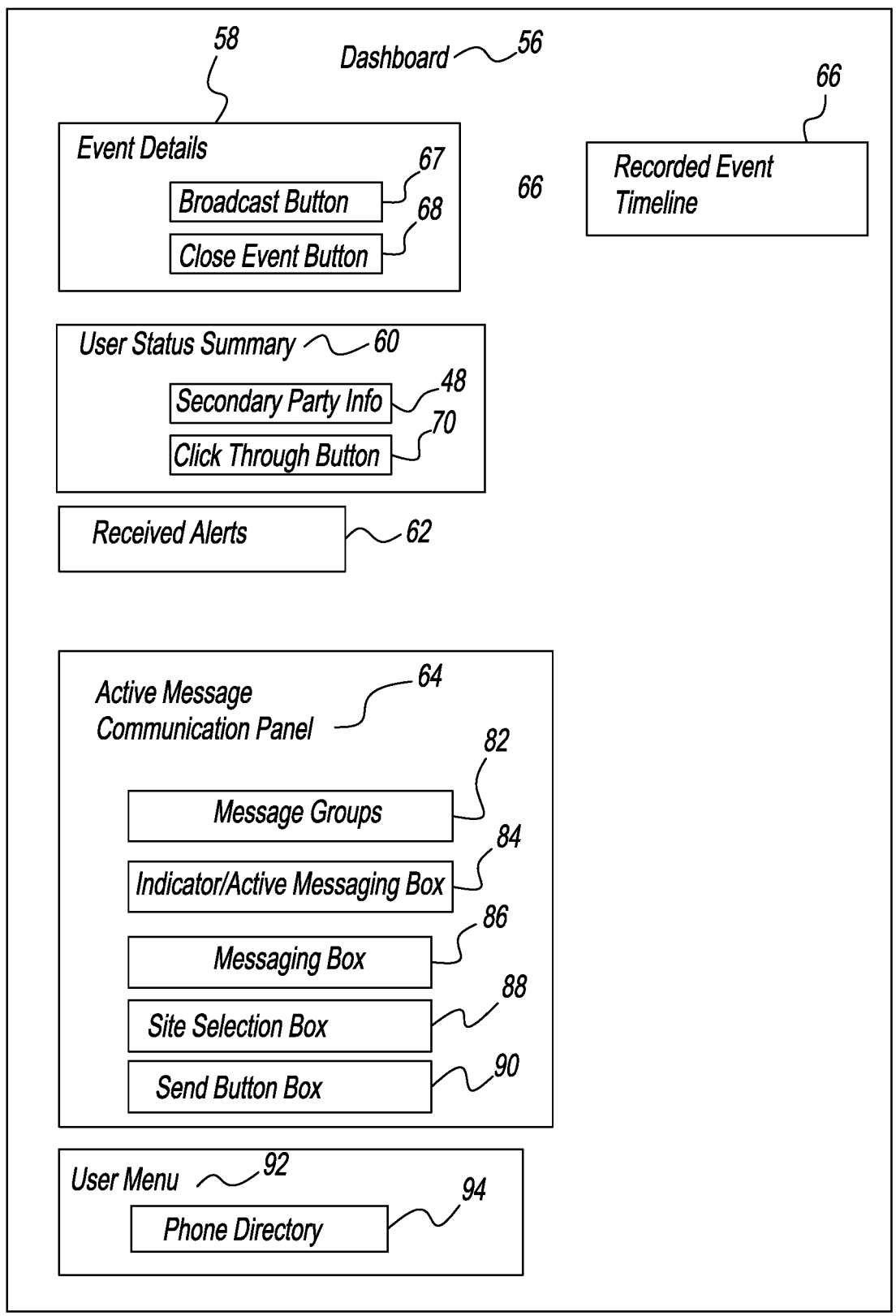
FIG. 2 is a schematic view of a dashboard for an emergency management system.
Figure 3:
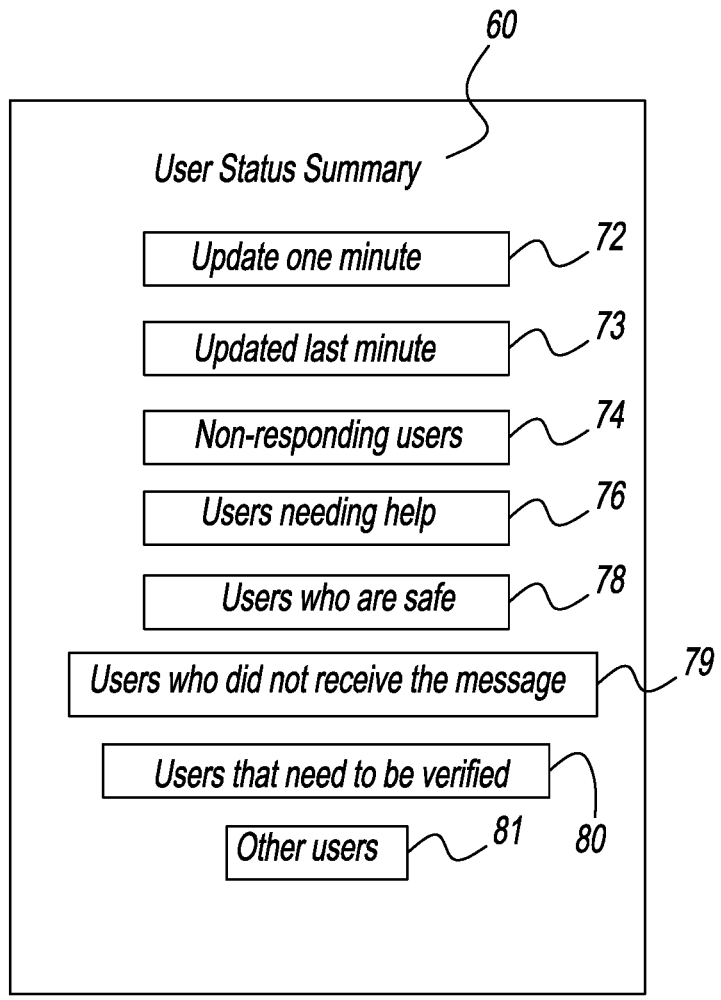
FIG. 3 is a schematic view of a user summary for an emergency management system.

An emergency management system 10 includes a downloadable or actively running accessible cloud-based website 12 such as a mobile phone application or a web-based URL landing page. The website 12 is connected to a computer 14 having a processor 16, software 18, and associated storage 20. Input or downloaded into storage 20 is information 22 related to multiple locations 24. The location information 22 includes, as an example only, the name of the location, the location layout, lockdown instructions, available access locations, and, preferably displayed on the layout or map, available assets 26 and their locations.

The website 12 is accessed by an initial responder 28 using a personal electronic device 30 such as a personal mobile phone or the like. The initial responder 28 provides notification of an emergency 32 in a number of ways. For example, once the website 12 is accessed the initial responder 28 can activate an emergency notification 32 function through a voice command, keyboard, or touch screen. Preferably, the website/phone application has a home screen 34 with an emergency notification icon 36 that when touched or held down for a predetermined amount of time activates the emergency notification 32 function of the system 10. In this manner a user is able to initiate a "see something, say something" report that immediately flows to security or administrators for research and immediate action if needed. Emergency icons might include buttons for Immediate help needed/SOS (panic button), medical, fire, active violence, explosion/gas, HAZMAT, Natural Disaster, Severe Weather, Lock Down, Shelter in Place, Security Alert, and other known to occur emergencies. Icons can be customized as well with a company logo or other desired icon. Icons also can be programmed to tie to a custom notification and/or audio and/or text alert or video alert that is associated with a specific emergency situation programmed into the emergency management system. Certain icons can even be programmed with vibration or silent alerts because of the nature of the emergency in process and the need for pure silence and no audible alert to be initiated, for the user's protection during harmful events.

The emergency notification 32 function, allows/enables a phone call to 911 dispatch if the user has mobile phone capabilities (for example, tablets will not call 911 or an iPad cannot call 911) and the user is able to dial out and wants to call 911 while reporting the emergency event inside the mobile application software system as well to administrative parties who can quickly take action (while the 911 phone call is going on as well). In addition, preferably, using a GPS system 38, location coordinates are seen by the user (on their mobile device screen or computer screen) and can be transmitted to 911 dispatch and/or the computer 14. Plus, the system can record latitude, longitude and even altitude to detect the floor of a building impacted during an emergency event. Dispatch centers for public events can utilize the system by permitting a CAD system outbound API patching with the EMERGENCY MANAGEMENT MOBILE APPLICATION SOFTWARE API or integration with CAD system. This patching allows public and/or approved mobile application users including licensed healthcare providers to receive notifications (within a certain perimeter/radius of the event/alert) that someone nearby needs help such as needing CPR and an AED, for example. The initial mobile or internet enabled device user/responder 28 may also be prompted by the computer 14 to provide additional emergency information 40 such as the type of emergency, the seriousness of the emergency, further location information, or any other relevant emergency information 40 to help with treatment and ensure assets (like an AED) have been grabbed, have arrived on scene, are on the way, telling us that someone has started CPR, or that the person has resuscitated (even before 911 responder arrival at scene). The prompt 41, as well as the initial responders 28 response can be done through voice command, keyboard/text, or icons on the touch screen. Alternatively, emergency information 40 is communicated by phone from the initial responder 28 to 911 dispatch and 911 dispatch enters emergency information 40 into the system 10. The computer 14 can record personal information 43 about the initial responder 28 such as name, position, location, and the like. Additionally, the system can record the time the 911 call was made for later incident management reporting and quality assurance review. The Administrator or manager of the system can see if 911 has been called when looking at the user and event details as well. The system is designed to capture and record all information from the time of alert and/or 911 outbound call all the way through to the closing of the emergency event by the site Emergency Administrator (who is managing the emergency event using the website).

Based upon the type of emergency, and location, the computer 14 notifies pre-selected primary parties 42 including the administrative parties that will be in charge of the emergency event and future communications between users and these administrators 44. The software application is focused on smart phone/mobile devices as well as internet device users overall and the software enables emergency dispatch (911 or otherwise) or other public or private security and communication centers to push out location aware alerts to EMERGENCY MANAGEMENT MOBILE APPLICATION SOFTWARE personal computer or mobile application software users. The primary designated administrator parties 44 may include 911 dispatch personnel, on-site administrators such as a principal or superintendent, hospital administrators, a building manager, on-site security guards, and the like. The designated administrative party 44 manages the event, the people, and the assets through a two-way communication system 46. The system is designed for use by school districts, colleges or universities, workplaces with a large number of employees, buildings with a very large square footage footprint, large public gathering spots, large healthcare venues such as hospitals, athletic venues or stadiums, convention centers or hospitality establishments with many occupants and other similar large areas or high traffic or high occupancy facilities. Unique to the application is that if there are users on a closed-loop private plan (such as at a school or a workplace or hospital), and if the county or other local critical command for the municipality or the Emergency Management Agency (EMA) for the county or region are using the emergency management app for public notification use, all app users—private and public notification users will get the alerts. App users do not need to log in using different credentials or use a different app or software application or website. Any user that utilizes the system for private area uses will also get alerts from the local dispatch or PSAP for weather or other publicly announced emergency alerts.

A secondary party or user of the system may notify the pre-selected designated administrator parties 44 through the touch of a button that an emergency exists. The designated administrator 44 would proceed to verify the information (through the data provided in the information provided by the user and user details) and can quickly broadcast the information to all site users, primary and secondary, for immediate following of any provided instructions. Alternatively, the computer 14 automatically notifies pre-selected secondary parties or users 48 based on the type of emergency and location from an alert or broadcast sent by a designated administrator after the initial user report. Alternatively, the administrative party 44 manually notifies secondary parties 48 through an alert created in the emergency management system 10. Secondary parties 48 include, as an example, first aid volunteer responder team members, students, employees, parents, individuals within a preselected distance to the emergency location, and the like. Any user that receives a notification is provided a user status reply card where they can reply back to the notification and communicate with administrators on current status, location, asset arrival time, asset use start time, CPR started time, other treatment start time, additional helpful information, questions they have or more assistance they need, and the like. The system is designed to provide a complete system of care for asset programs in emergency management: asset compliance, tracking, reporting, usage, people using or needing the assets, and people responding to or managing the emergency events that may or may not require use of the assets in the database. The system also allows for running drills both from the field (both inside the mobile app or in the Admin portal) or from the office/facility setting and recording data during the drills for quality assurance and continual updates of the emergency response and planning systems by the organization using the system. The system additionally also allows notification events that 'stack' where multiple reported events or multiple users can generate an alert that can be run at the same time or in a single event setup where the users and Administrators can only have one commonly occurring event and updates being broadcast at a time.

Users 48 receive real-time location aware notifications that provide detailed data on the nearest asset (AED, stop the bleed or active shooter kits, HAZMAT trailer, etc.) and where the emergency is as well as updates during the emergency event. Users can also actively update their status and provide any updated information at any time through the emergency system. This information allows for more immediate response times than what current PSAP dispatched 911 EMS, Fire or Law Enforcement care can achieve and can better manage and archive data during critical multiple person or community-wide or organization-wide events. The end result is improvement in the chain of survival through improved CPR and AED response times or other emergency response times due to the more immediate proximity of the EMERGENCY MANAGEMENT MOBILE APPLICATION SOFTWARE app user's current location and their ability to help more immediately than EMS, Fire, Law Enforcement or other public safety that is en route. The users are also identified in 'hot spots' or areas that identify where someone needs help once law enforcement or EMS arrives, if the emergency situation is an active violence event or terrorism event involving hostages or locked down facilities. The entire system is designed to improve real-time communication on assets and people during emergencies or events at a venue such as a campus building, or other location that has a large footprint, high traffic and high occupancy and is highly attended by people. Local 911 officials can also be given access to the system to allow viewing of the facility floor plan, blue prints, evacuation maps, and other key information on the event and people impacted or assets nearby that can be used to help manage the emergency.

Preferably, the system uses new push notifications that are quickly delivered to users, as long as any internet accessible device or portable WI-FI signal or cell phone tower signal is active and allowing communication. Preferably, the system messages and alerts push through a system that is backed by Apple Push Notification (APN) and Google Cloud Messaging (GCM) networks or similar mass notification mobile enabled or computer enabled networks, which ensures data is delivered quickly. Push notifications are sent real-time and the receipt and delivery can be seen as well as the read status and the location of the users that receive the notifications or alerts. Locations of users receiving notifications can be viewed quickly and they push through the cell phone tower quicker than phone calls or text/SMS messages that can be delayed by cell phone towers that can be tied up during mass or natural disasters. Traditional text or email message and voicemail or phone and computer messaging systems can also be utilized in addition to push notification systems by the emergency management system.

Upon notification, using a GPS system 38, the computer 14 identifies the location of each primary and secondary party 44 and 48 and displays their location on a map 50. The computer 14 also prompts 51 the secondary party 48 to respond. The prompt 51 may include touch screen icons 52 associated with varying status information 53 such as safe, need help, I have information (and comments), not sure, or the like. In addition, a secondary party 48 can provide more expanded detailed response and comments through a keyboard, voice command, hot key, or the like. Each status update response 52 or user status response category is associated with a different color which is associated with the secondary parties 48 location on the map 50 and the location is updated by the color associated with the response. There is also a color for those who do not respond but have received the alert/notification and a color for those that did not receive the alert/notification (phone or device was turned off). In this manner, the administrator party 44 is able to more easily identify hot spots or problem areas on the map where secondary users need immediate attention by public safety or 911 dispatched rescuers upon arrival at the emergency 50.

The administrator party 44 manages the event and the people by selecting what information received is communicated back to secondary parties 48. While some instructions may be preprogrammed into the computer 14, other instructions and/or questions may be input manually through a keyboard or voice command. These subsequent communications 54 may include instructions such as stay put, directions to another location, and/or a map 50 showing assets 26 with directions on how to get to the assets 26. Questions may include things like "How many are with you?, Is anyone injured?, and/or Please update your status." The system may allow administrators to send comments or they may be allowed to send text, video or audible recorded instructions on how to treat injuries or perform certain tasks to keep others safe or treat those that are injured more quickly and decrease time for treatment, to help provide priority treatment to those with critical life threatening injuries or illnesses.

The administrative party 44 has a dashboard 56 that assists in managing the event. The dashboard 56, as an example, includes sections that include details about the event 58, event user status summary that provides color-coded categories that those that need immediate attention or emergency administrators to be contacted first 60, alert received by 62, active group messaging/incoming and outgoing messages and communication panel 64, and a recorded event timeline 66 to include any recorded sub-events that are being reported by users that are likely all part of the main event but need to be filtered and reviewed for any event management that may be required separate from the currently active event in process.

The event details section 58 includes, as an example, the site/location name, the date and time of the original alert, and personal information about the initial users and any responders 28. The initial event alert sent to Administrators includes information on what groups the alert was sent to as well as other groups it was not sent to yet (who can be alerted depends on user privileges). Also, the event detail section would include information about the type of emergency such as a graphic or the like and a click through that takes one to a display of the map 50, a button 67 to broadcast the event to different groups of users, and a button 68 to close the event or broadcast the event to additional groups.

The message center has color-coded conversation strings of an original alert or script on what the emergency is and what to do, any broadcasts, and then the user responses that include comments or information (text format but could include photos or videos in future versions), for administrator to monitor the communication from users and manage the emergency more efficiently and by utilizing triage tactics to enable saving more lives and shutting down harmful or dangerous areas more quickly. Any alerts or broadcasts allow for viewing the name of the party sending the information update and what groups or any user information on that administrator for total transparency during emergencies. The scripts that are used for any event/alert created, broadcast, or closed can all be uploaded and/or created and saved and edited for immediate access to scripted information to share during events or to broadcast quickly. These scripts are helpful for sending the right information on what to do (without typing) for specific secondary users with job duties or tasks to perform or Press and public notice information releases that need to be distributed to the community.

Asset registration and detailed mapping is important along with timely communication. See picture of the Assets page in the EMMA Admin Panel—where you can program in what you want to track on the map 50 (pins the assets and has an icon on map to show where these are). The assets we have on the picture included are being shown on the MAP on the mobile app are Active Shooter kits—they will be pinned on the mobile map on EMMA home screen with the EMMA ! icon (to initiate an emergency) for use by users of the internet URL or mobile app. The emergency management system can interact with RFID tracking systems and QR Codes and allow for quick download of the app, RFID tag mapping of critical assets (including staff/guests/employees trapped inside a building but not near a PC/mobile device but that have a RFID badge detected) or users inside a footprint being monitored by the emergency management system.

Widely documented and proven is that publicly available AEDs are rarely retrieved and used because bystanders generally cannot see them and have no way to know if one is even available nearby. Statistics from the CARES (Cardiac Arrest Registry to Enhance Survival) Registry indicate that publicly available AEDs are used less than 3% of the time when needed and available. Through testing, accurate and complete public AED location information increases use to above 60% usage of publicly placed assets. The same could be said for active shooter or responder kits that can assist people at emergencies that need quick access to stop the bleed kits, active shooter kits, tourniquets, blood clotting supplies or other trauma supplies very quickly. The types of assets that can be monitored and reported include automated external defibrillators (AEDs), Stop the Bleed or Active Shooter/Man Down Kits, HAZMAT or hazardous response trailers or supplies, rife safety equipment, medical kits or responder bags, first aid stations, emergency aid stations, and any other emergency assets that might be needed by people within the community or area being monitored by EMERGENCY MANAGEMENT MOBILE APPLICATION SOFTWARE and emergency management officials. The ability to map key assets is important for National Incident Management (NIMS) events, mass disasters, homeland security events, or large crowds and community events especially for traffic flow and improved mapping to allow quicker access to resources during emergency events.

The event user status summary 60 would provide updated information related to the secondary parties 48 who both have and have not responded. The user status summary allows for quickly triaging and attending to those that need more help or need to be scrutinized by the emergency administrators. The user status summary when selected will provide details on users in that category as a quick access phone tree and follow up tree for administrator processing and attention. The user status summary is arranged in a way to allow the administrator to see by color-code and by order of priority in the summary where to focus first. As an example, provided are click through buttons 70 that lead the administrator to a secondary page having more detailed information on users and their messages received include: users last updated one minute ago 72, users from whom a message has been updated in the last minute 73, users who have not responded 74, users who need help 76, users who are safe 78, users who did not receive the message 79, users that need to be verified as their response is suspicious 80 (they responded but did not enter a correct authentication PIN) and other users 81.

The active group messaging panel 64, as an example, includes a list of message groups 82 and an adjacent indicator/activation box 84. The indicator/activation box 84, with a color, indicates whether a particular message group 82 is actively involved in communication related to the event. Communication with the message group 82 is automatically activated based upon the type and location of the event or manually active by the administrative party by selecting or deselecting the indicator/activation box 84. The active group messaging panel also has a message box 86, a pull down site selection box 88, and a send button 90. The message box 86 permits the administrative party to input a message to active message groups through a keyboard, voice command, or the like. The site selection box 88 permits the administrative party to select all or specific sites for the message to be sent to, including each site allowing for programming in GPS coordinates for latitude and longitude to allow for Administrators or public emergency system use that is geofenced and only sends alerts to those that are within an impacted area; it will not send the alert or notification to those outside the impacted/selected area. The send button 90 permits the administrative party to send the message to the active message groups as the selected sites.

Groups are managed by the Administrators and have a quick access screen in the Admin panel menu that allows seeing what groups can send information to what other groups. Viewable via a click is the quick access to information on any user that is in the group for a quick access phone or messaging directory for emergency management access if needed. In the same manner, users can be viewed by a User Menu item 92 that shows what groups they belong to and who they can message/alert. The user menu 92 allows seeing a phone directory 94 and allows quick access phone or messaging directory for emergency management access if needed. Of note is that some users are RECEIVE ONLY in that they may not be allowed to communicate back (such as parents of students who need information but do not need to be part of the emergency event or guests at a large public event). Users of the system can have expiring access or can be provided unlimited access without any expiration date for receiving alerts or sending alerts through the notification system.

The event timeline 66 displays a real-time record of events that occur related to the event. As an example, the event timeline 66 displays information related to various communications made during the event including the date, the time, the name of the person or party sending the communication and the communication itself (i.e. "all clear"). The timeline has color-coding to tie to the user status and a hover box to show more detail. The timeline is designed to see the 'continuum of care' and the progress of communication throughout the emergency event. This timeline all ties to a report that can be generated that shows the incident for an incident debriefing that is very concise and detailed on what happened and when. The emergency management system is capable of providing many reports from user status to event data statistics to drill statistics to user response timelines and types of devices used to respond, and so on.

The system is also designed to decrease the probability of false alarms as it is designed to capture any information on users, actions and events. False alarms are identified by incorrect login attempt monitory, PIN verifications for any information submission, and incorrect PIN identification to administrators. Only administrators will receive information involving suspect activity or incorrect PIN submission or forgotten PIN use.

The system also is a way to provide information using notifications that disappear when the emergency event is closed. For example, if a user receives any notification, they click on it for more information (the pop up notification that comes in) and the user response card comes up, requesting the user to provide their status and any comments. The SUBMIT processes the user status and the user inputs the PIN to validate their response and the information goes into the event for administrator review. Once the notification has been pressed, there is not any screen print that can be obtained on the emergency in progress. Therefore, it allows for reducing the information being sent via social media to other outside parties such as the press/media that may want to arrive and cover the event and make emergency management more difficult. When an event closes, the notifications disappear, even if the user never clicked on them or pressed on them to respond back. Once the notifications are selected, they disappear as well, they do not stay in the users current notifications from that day or notification history. This is important as mobile devices have been used to broadcast negative events very quickly and create panic with the public.

From the above discussion and accompanying figures it will be appreciated that the emergency management system 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:
1. An emergency management system comprising:
   a website connected to a computer having a processor, software, and storage;
   location information stored in the computer;
   an initial responder who transmits an emergency notification to the computer using a first electronic device;
   at least one pre-selected primary party, at least one pre-selected primary on-site administrative party, and at least one pre-selected secondary party who are notified through a plurality of second electronic devices by the computer about the emergency notification;
   wherein the at least one pre-selected primary party is trained in public safety;
   wherein the at least one pre-selected secondary party is selected from a group consisting of a student that is untrained in public safety, an employee that is untrained in public safety, a visitor that is untrained in public safety, a guest, and a parent that is untrained in public safety; and
   a two-way communication system between the at least one pre-selected primary party and the at least one pre-selected secondary party that is viewable and managed by the at least one pre-selected primary administrative party, wherein the two-way communication system is configured to continually communicate with all parties;
   wherein the at least one pre-selected primary on-site administrative party has a dashboard on the emergency management system software that is configured to provide instructions, location directions, asset loca- tions, comments, and questions to the at least one pre-selected secondary party.

2. The system of claim 1 wherein the emergency notification includes a type of emergency and GPS coordinates selected from a group consisting of a location of the initial responder and a location of the emergency location.

3. The system of claim 1 wherein the location information is selected from a group consisting of a location layout, an emergency notification, an emergency instruction, an alert notification, an alert instruction, a status of the emergency location, at least one asset located inside the emergency location, and GPS coordinates.

4. The system of claim 1 wherein the at least one pre-selected primary administrative party is selected from a group consisting of a 911 dispatch personnel, a 911 EMA personnel, an incident command officer, a principal, a superintendent, a hospital administrator, a building administrator, an on-site security guard, and a school resource officer.

5. The system of claim 1 wherein the emergency notification is selected from a group consisting of a push communication, an email, a text message, a phone message, and a voicemail message.

6. The system of claim 1 wherein the at least one pre-selected primary and secondary parties are prompted by the computer to provide a user status response to provide continual status updates including 911 call date and time and comments.

7. The system of claim 1 wherein the pre-selected primary administrative party has access to a dashboard that includes event or drill status, primary notification details, primary and secondary user status and detail summaries, GPS mapping details on lifesaving assets nearby, user location color-coded mapping, and an active messaging panel.

8. The system of claim 1 wherein the at least one pre-selected primary party and the at least one pre-selected primary administrative party, and the at least one secondary party is pre-selected based on a type of emergency and the pre-selected distance from the emergency location.

9. The system of claim 1 wherein the location information is a location of an automated external defibrillator (AED).

10. The system of claim 1 wherein the pre-selected secondary party is predefined by a type of emergency.

11. The system of claim 1 wherein the pre-selected secondary party is pre-defined by a type of an emergency and a pre-defined location of the emergency.

12. The system of claim 1 wherein the emergency notification is sent as a text/SMS message and a phone call through a mobile phone application by the initial responder.

13. The system of claim 1 wherein the computer sends at least one update in a push notification, an email, a text message, a phone message, and a voicemail message.

14. The system of claim 1 wherein the at least one pre-selected primary administrative party sends a recorded instruction through the computer to the at least one pre-selected secondary party.

15. The system of claim 1 wherein the computer records all information sent to the computer regarding an emergency event starting from the receipt of the emergency notification until the end of the emergency event; and the at least one pre-selected primary party can view the information recorded by the computer.

16. The system of claim 1 wherein the at least one pre-selected primary on-site administrative party is selected from a group consisting of a school principal, a school superintendent, a building manager, and a security guard.

17. The system of claim 1 wherein the at least one pre-selected primary on-site administrative party notifies the at least one pre-selected secondary party using an alert having a user status reply card that the at least one pre-selected primary on-site administrative party manually creates through the emergency management system software.

18. An emergency management system comprising:
a website connected to a computer having a processor, software, storage, and location information;
an initial responder who transmits an emergency notification to the computer using a first electronic device;
a primary party trained in public safety who is notified through a plurality of second electronic devices by the computer about the emergency notification; and
a two-way communication system between the primary party and a secondary party that is viewable and managed by a pre-selected primary administrative party, wherein the two-way communication system is configured to continually communicate with all parties; and
wherein the pre-selected primary administrative party has a dashboard on the emergency management system software that is configured to provide instructions, location directions, asset locations, comments, and questions to the secondary party.

19. The system of claim 18 wherein the secondary party is selected from a group consisting of a student that is untrained in public safety, an employee that is untrained in public safety, a visitor that is untrained in public safety, a guest, and a parent that is untrained in public safety.

* * * * *